(12) United States Patent
Kuwahara

(10) Patent No.: US 12,172,460 B2
(45) Date of Patent: Dec. 24, 2024

(54) THREE-DIMENSIONAL DECORATIVE PIECE MADE OF THERMOPLASTIC SYNTHETIC RESIN AND METHOD FOR PRODUCING THE SAME

(71) Applicant: Takeshi Kuroda, Osaka (JP)

(72) Inventor: Eiji Kuwahara, Osaka (JP)

(73) Assignee: Takeshi Kuroda, Osaka (JP)

( * ) Notice: Subject to any disclaimer, the term of this patent is extended or adjusted under 35 U.S.C. 154(b) by 180 days.

(21) Appl. No.: 18/091,531

(22) Filed: Dec. 30, 2022

(65) Prior Publication Data
US 2023/0148211 A1 May 11, 2023

Related U.S. Application Data

(62) Division of application No. 16/767,411, filed as application No. PCT/JP2017/046973 on Dec. 27, 2017, now abandoned.

(51) Int. Cl.
*B44C 3/02* (2006.01)
*B32B 7/12* (2006.01)
(Continued)

(52) U.S. Cl.
CPC ............... *B44C 3/02* (2013.01); *B32B 7/12* (2013.01); *B32B 15/08* (2013.01); *B32B 27/08* (2013.01);
(Continued)

(58) Field of Classification Search
CPC .... B44C 3/02; B44C 5/04; B32B 7/12; B32B 15/08; B32B 27/08; B32B 38/0008; B32B 38/06; B32B 38/145; B32B 2451/00
See application file for complete search history.

(56) References Cited

U.S. PATENT DOCUMENTS

| 5,143,672 A | 9/1992 | Kuwahara |
| 6,217,694 B1 | 4/2001 | Taniguchi |

(Continued)

FOREIGN PATENT DOCUMENTS

| CN | 101610916 A | 12/2009 |
| CN | 106163820 A | 11/2016 |

(Continued)

OTHER PUBLICATIONS

JP20052531A; Naito Sanenari; Sep. 22, 2005.*

(Continued)

*Primary Examiner* — Vishal I Patel
(74) *Attorney, Agent, or Firm* — Oliff PLC

(57) ABSTRACT

A three-dimensional decorative piece made of a thermoplastic synthetic resin is produced by subjecting, to high-frequency dielectric heating, a decorative piece material that includes an upper layer that includes a thermoplastic synthetic resin film having a vapor-deposited metal layer, an intermediate layer that includes a thermoplastic synthetic resin sheet, and a lower layer that includes a thermal bonding film, the decorative piece including: a first printing layer printed using a transparent color ink, a matte ink, or a glossy ink, as an upper surface of the upper layer; and a second printing layer in which a fine line is printed using a transparent UV ink, on an upper surface of the first printing layer. It is desirable that the fine line of the second printing layer has a width of 0.1 mm to 0.25 mm.

2 Claims, 6 Drawing Sheets

(51) Int. Cl.
  *B32B 15/08* (2006.01)
  *B32B 27/08* (2006.01)
  *B32B 38/00* (2006.01)
  *B32B 38/06* (2006.01)
  *B44C 5/04* (2006.01)

(52) U.S. Cl.
  CPC .......... *B32B 38/0008* (2013.01); *B32B 38/06* (2013.01); *B32B 38/145* (2013.01); *B44C 5/04* (2013.01); *B32B 2451/00* (2013.01)

(56) References Cited

U.S. PATENT DOCUMENTS

| | | |
|---|---|---|
| 2011/0189445 A1 | 8/2011 | Takeuchi et al. |
| 2016/0024326 A1 | 1/2016 | Khan et al. |
| 2017/0326900 A1 | 11/2017 | Fuhse et al. |
| 2018/0051195 A1 | 2/2018 | Park et al. |

FOREIGN PATENT DOCUMENTS

| | | |
|---|---|---|
| CN | 106691040 A | 5/2017 |
| DE | 19725807 A1 | 1/1998 |
| JP | H01-166933 A | 6/1989 |
| JP | H02-145320 A | 6/1990 |
| JP | H07-205600 A | 8/1995 |
| JP | 2001-225306 A | 8/2001 |
| JP | 2002-254897 A | 9/2002 |
| JP | 2003-302904 A | 10/2003 |
| JP | 2005254531 A | 9/2005 |
| JP | 2015-36201 A | 2/2015 |

OTHER PUBLICATIONS

Mar. 13, 2018 International Search Report issued in International Patent Application No. PCT/JP2017/046973.
Jan. 13, 2021 Office Action issued in Chinese Patent Application No. 201780097426.5.
Machine Translation via EPO of Naito JP 2005-254531 (Year: 2005).

\* cited by examiner

THREE-DIMENSIONAL DECORATIVE PIECE MADE OF THERMOPLASTIC SYNTHETIC RESIN AND METHOD FOR PRODUCING THE SAME

This application is a Divisional of application Ser. No. 16/767,411, filed May 27, 2020, which is a national stage of PCT/JP2017/046973, filed Dec. 27, 2017. The entire contents of the prior applications are hereby incorporated by reference herein in their entirety.

TECHNICAL FIELD

The present invention relates to a three-dimensional decorative piece made of a thermoplastic synthetic resin, such as an emblem to be affixed to clothing such as uniforms, a bag, a cap, or the like, and a method for producing the same, and more specifically relates to a three-dimensional decorative piece made of a thermoplastic synthetic resin provided with a decoration such as that of gold lace embroidery and a method for producing the same.

BACKGROUND ART

Three-dimensional decorative pieces made of a thermoplastic synthetic resin (hereinafter referred to simply as "decorative pieces", if appropriate), such as emblems, appliques, and stickers, produced through high-frequency dielectric heating have been proposed (see Patent Document 1, for example).

In Patent Document 1, a decorative piece material that includes a thermoplastic resin sheet, a vapor-deposited metal layer, and a foamed resin sheet and a base material sheet made of a woven fabric are placed on each other, and as a result of performing high-frequency dielectric heating thereon, an insulator generates heat, the foamed resin sheet is expanded and shaped, and the layers are welded to each other, and thus a decorative piece is produced.

CITATION LIST

Patent Document

[Patent Document 1] Japanese Patent No. 1815053

SUMMARY OF INVENTION

Technical Problem

Some decorative pieces produced through embroidery are provided with gold lace embroidery by embroidering a base material with a so-called gold lace thread obtained by winding a gold thread and a silver thread around a core thread. However, with conventional three-dimensional decorative pieces made of a thermoplastic resin produced through high-frequency dielectric heating, while uneven designs can be expressed, sufficient expression of a sense of luxuriousness, an aura of substance, elaborateness, a depth of color, a metallic appearance, and the like such as those of gold lace embroidery has not been possible. One of the reasons therefor is that there is a limitation on how fine a design can be formed in an engraved die used in high-frequency dielectric heating. Thus, when a gold lace design needs to be formed, embroidery has needed to be manually performed using a gold lace thread. Also, there are cases where a thermoplastic synthetic resin film and a base material sheet are separated from each other through washing, friction, and the like due to insufficient adhesive strength between the thermoplastic synthetic resin film and the base material sheet.

An object of the present invention is to provide a three-dimensional decorative piece made of a thermoplastic synthetic resin by which a design such as that of a gold lace thread can be expressed, and a method for producing the same.

Solution to Problem

A three-dimensional decorative piece made of a thermoplastic synthetic resin according to the present invention is a three-dimensional decorative piece made of a thermoplastic synthetic resin that is produced by subjecting, to high-frequency dielectric heating, a decorative piece material that includes an upper layer constituted by a thermoplastic synthetic resin film having a vapor-deposited metal layer, an intermediate layer constituted by a thermoplastic synthetic resin sheet, and a lower layer constituted by a thermal bonding film, the decorative piece including:
a first printing layer printed using a transparent color ink, a matte ink, or a glossy ink, as an upper surface of the upper layer; and
a second printing layer in which a fine line is printed using a transparent UV ink, on an upper surface of the first printing layer.

It is desirable that the fine line of the second printing layer has a width of 0.1 mm to 0.25 mm.

It is desirable that the upper layer has a protruding portion formed through shaping, and
the fine line of the second printing layer is printed to intersect an edge portion of the protruding portion.

The upper layer may be configured to include a migration prevention film layer.

Also, a method for producing a three-dimensional decorative piece made of a thermoplastic synthetic resin according to the present invention is a method for producing a three-dimensional decorative piece made of a thermoplastic synthetic resin by subjecting, to high-frequency dielectric heating, a decorative piece material that includes an upper layer that is constituted by a thermoplastic synthetic resin film having a vapor-deposited metal layer, has an outline, and is provided with a three-dimensional design, an intermediate layer constituted by a thermoplastic synthetic resin sheet, and a lower layer constituted by a thermal bonding film, wherein the upper layer is formed through
a step of forming a first printing layer in the upper layer by screen printing a transparent color ink, a matte ink, or a glossy ink onto an upper surface of the thermoplastic synthetic resin film,
a step of forming a second printing layer in the upper layer by screen printing a fine line using a transparent UV ink onto an upper surface of the first printing layer,
a step of curing the second printing layer by irradiating the second printing layer with ultraviolet rays, and
a step of attaching an adhesive carrier film to an upper surface of the second printing layer,
the method including:
a step of placing the decorative piece material in which the lower layer, the intermediate layer, and the upper layer are placed on each other in the stated order, on a table serving as one electrode in high-frequency dielectric heating, a first high-frequency dielectric heating step of shaping the three-dimensional design in the upper layer by pressing an engraved die serving as another electrode in high-frequency dielectric heating against the upper layer of the decorative piece material and performing high-frequency dielectric heating, and fusion-cutting the decorative piece material other than the carrier film along the outline and fusing the upper layer and the intermediate layer to weld the resulting layer to the lower layer, an elimination step of eliminating an unnecessary portion that does not constitute the three-dimensional design of the fusion-cut decorative piece material to obtain a decorative piece material, a second high-frequency dielectric heating step of welding a base material and the decorative piece material by fitting the decorative piece material into the engraved die placed on the table with an engraved surface facing upward such that the lower layer faces upward, placing the base material on the decorative piece material, pressing the base material against the decorative piece material using a flat-plate die from above the base material, and performing high-frequency dielectric heating, and an adjustment step of removing, from the engraved die, the decorative piece material and the base material that are welded to each other, peeling off the carrier film, and cutting the base material to a desired shape to obtain a three-dimensional decorative piece made of a thermoplastic resin.

Effects of the Invention

According to the three-dimensional decorative piece made of a thermoplastic synthetic resin and the method for producing the same according to the present invention, the decorative piece material has, as a surface of the upper layer, a second printing layer in which a fine line is printed using a transparent UV ink. This fine line of the second printing layer can express a design such as that of gold lace embroidery on a protruding design formed by shaping the upper layer, and can express, on a three-dimensional decorative piece made of a thermoplastic synthetic resin, a three-dimensional appearance, a texture, a sense of luxuriousness, elaborateness, a metallic appearance, and the like such as those of gold lace embroidery, by increasing the thickness of a printed fine line.

DESCRIPTION OF EMBODIMENTS

Figure 1:
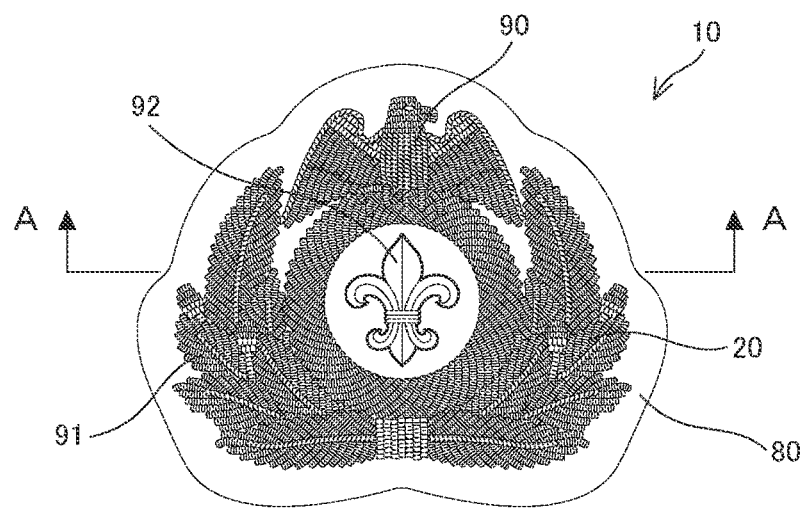
FIG. 1 is a plan view of a decorative piece according to an embodiment of the present invention.

Hereinafter, a three-dimensional decorative piece 10 made of a thermoplastic synthetic resin of the present invention and a method for producing the three-dimensional decorative piece 10 will be described with reference to the drawings. Note that, in the drawings, the thicknesses of a layer is shown exaggerated to facilitate the explanation as needed. Also, the shapes, the designs, the thicknesses, and the like of the decorative piece 10, a decorative piece material 20, a base material sheet 80, and the like are given by way of example only, and can be changed as appropriate.

Figure 2:
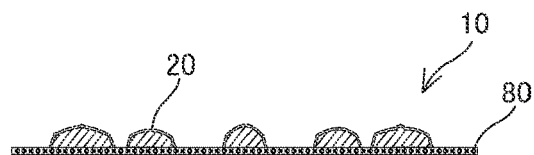
FIG. 2 is a cross-sectional view of the decorative piece shown in FIG. 1 cut along line A-A and viewed in the arrow direction.
Figure 3:
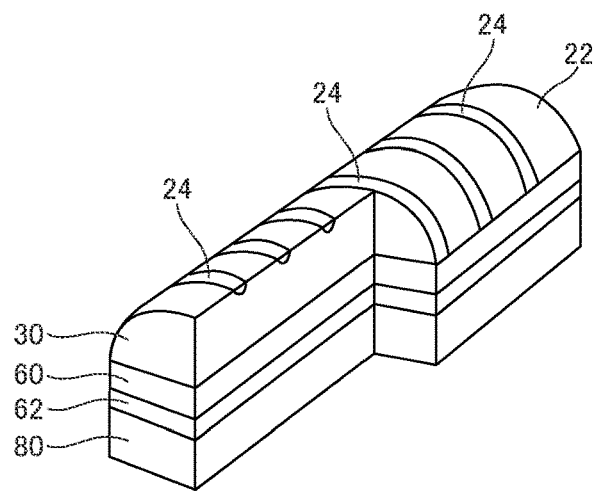
FIG. 3 is a schematic enlarged cross-sectional perspective view of a shaped protruding portion.

FIG. 1 is a plan view of the decorative piece 10 according to an embodiment of the present invention, FIG. 2 is a cross-sectional view of the decorative piece 10 shown in FIG. 1 cut along line A-A and viewed in the arrow direction, and FIG. 3 is an enlarged cross-sectional view showing an overview of one protruding portion 22 of a decorative piece material 20 that has been shaped. Note that FIG. 3 shows the decorative piece material 20 as one layer excluding a fine line 51 to facilitate the explanation. As shown in FIGS. 1 and 2, the decorative piece 10 is formed by welding the shaped decorative piece material 20 onto the base material sheet 80. The decorative piece material 20 is provided with desired recesses and protrusions, and a desired design, and a contour portion of the design is fusion-cut. In an embodiment shown in FIGS. 1 to 3, designs formed by the decorative piece material 20 includes a bird 90 perched on a ring, plant leaves 91, and a central lily emblem 92. As shown in FIG. 3, in the bird 90 and the leaves 91 out of these designs, minute designs 24 such as those of lace embroidery are expressed on the shaped protruding portion 22. As shown in FIG. 3, these minute designs 24 such as those of lace embroidery are realized by printing minute fine lines 51 (see FIGS. 4 and 7) onto the protruding portions 22 of the designs using a transparent UV ink. Note that a minute design such as that of lace embroidery can be optionally applied to any design, and naturally, it is also possible to apply lace embroidery designs to all of the designs.

Figure 4:
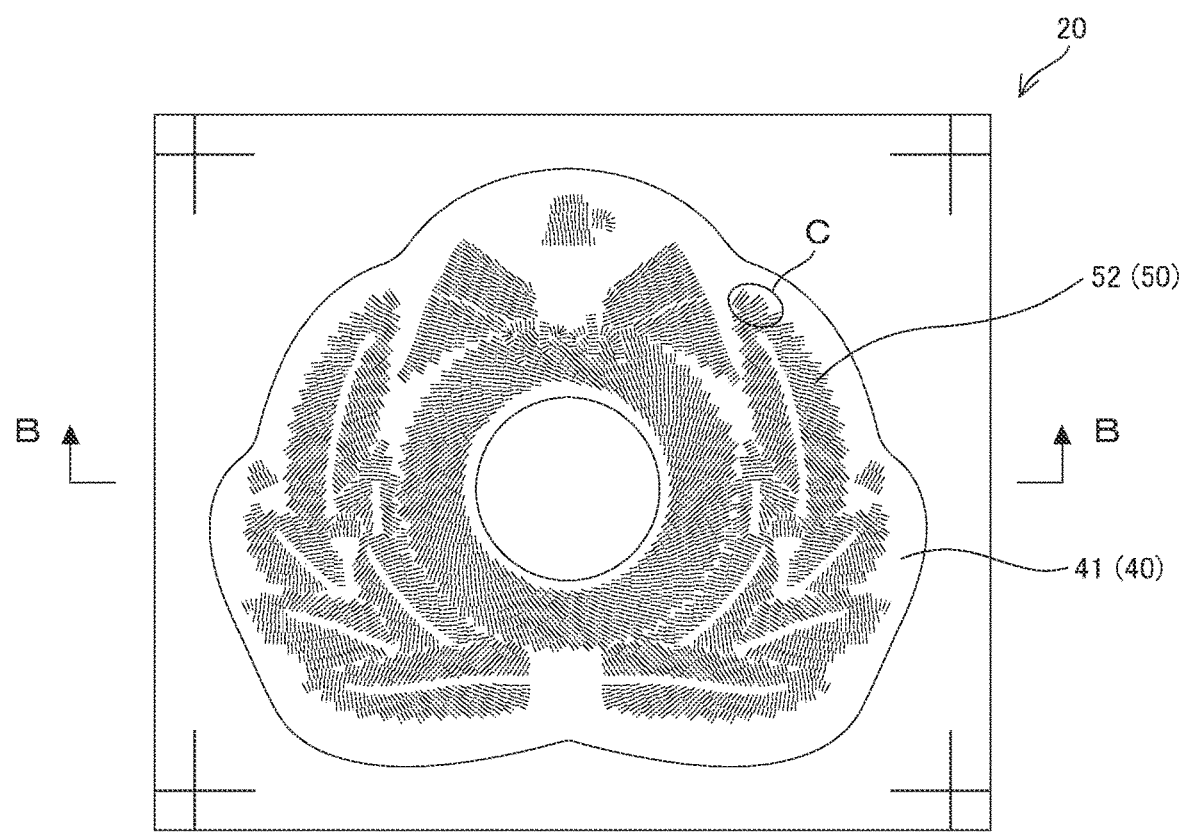
FIG. 4 is a plan view of a decorative piece material.
Figure 5:
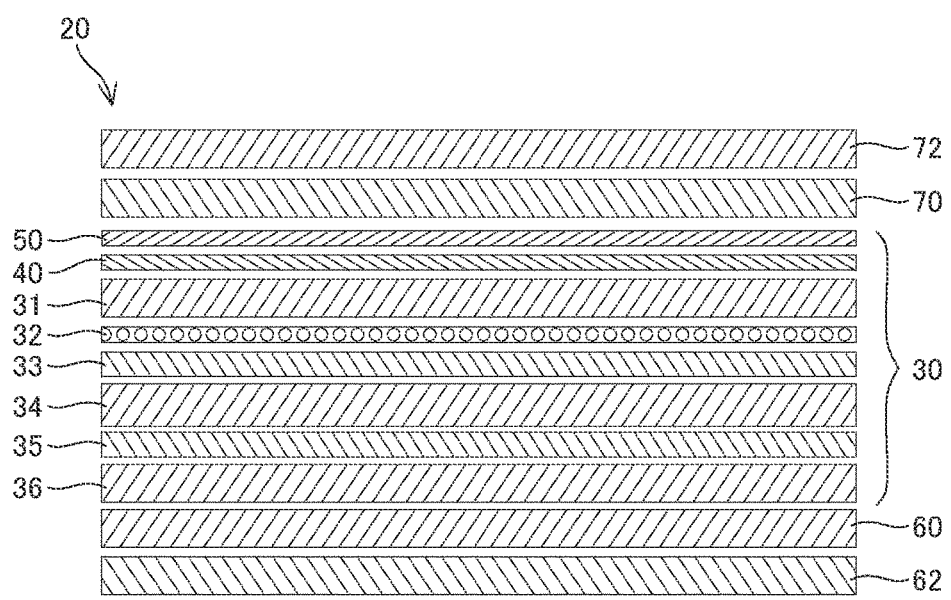
FIG. 5 is a cross-sectional view of the decorative piece shown in FIG. 4 cut along line B-B and viewed in the arrow direction.

FIG. 4 is a plan view of the decorative piece material 20, and shows a diagram thereof before the high-frequency dielectric heating step is performed. Also, FIG. 5 is a cross-sectional view of the decorative piece 20 shown in FIG. 4 cut along line B-B and viewed in the arrow direction. As shown in FIG. 5, the decorative piece material 20 includes an upper layer 30, an intermediate layer 60, and a lower layer 62, and the upper surface of the upper layer 30 is provided with a first printing layer 40 (a design 41) and a second printing layer 50 (a design 52), and in this embodiment, the bird, the leaves, and the lily emblem are lastly formed by designs of these printing layers 40 and 50, and through shaping.

In the decorative piece material 20, the upper layer 30, the intermediate layer 60, and the lower layer 62 are integrated with each other through a first high-frequency dielectric heating step. Also, a carrier film 70 for holding a design separated in a production process at a predetermined position, and a polypropylene film 72 for protecting the carrier film 70 may be attached to the upper surface of the decorative piece material 20. Hereinafter, configurations and typical materials of the layers will be described as examples.

As shown in FIG. 5, the upper layer 30 is a laminated film including a thermoplastic synthetic resin film 31 that can be molded through high-frequency dielectric heating, a vapor-deposited metal layer 32, and the like. The thermoplastic synthetic resin film 31 may be made of a soft thermoplastic synthetic resin such as polyurethane, for example. In the example shown in the drawings, the vapor-deposited metal layer 32 is formed on the thermoplastic synthetic resin film 31 that is located on the upper surface side, through metal vapor deposition. Also, a migration prevention film 34 is provided on a lower surface of the vapor-deposited metal layer 32 via an adhesive layer 33, and furthermore a thermoplastic synthetic resin film 36 is provided thereunder via an adhesive layer 35, thus forming a six-layer structure.

Examples of the migration prevention film 34 may include an ethylene-vinyl alcohol copolymer (EVOH) film and a polyamide resin-based film such as polyamide MXD6, and the migration prevention film 34 prevents a dye of the base material sheet 80 and a dye of a garment or the like to which the decorative piece 10 is attached from migrating to a front surface side of the decorative piece material 20.

A soft sheet of a thermoplastic synthetic resin or a foamed resin sheet can be used as the intermediate layer 60, and the intermediate layer 60 may be made of a thermoplastic synthetic resin such as soft polyvinyl chloride (PVC), for example.

A thermal bonding film can be used as the lower layer 62. Examples of the thermal bonding film include polyamide-based, polyurethane-based, polyester-based, and ethylene vinyl acetate copolymer (EVA)-based films. Note that the material of the lower layer 62 can be selected as appropriate depending on the type of base material sheet 80, which will be described later.

Figure 6:
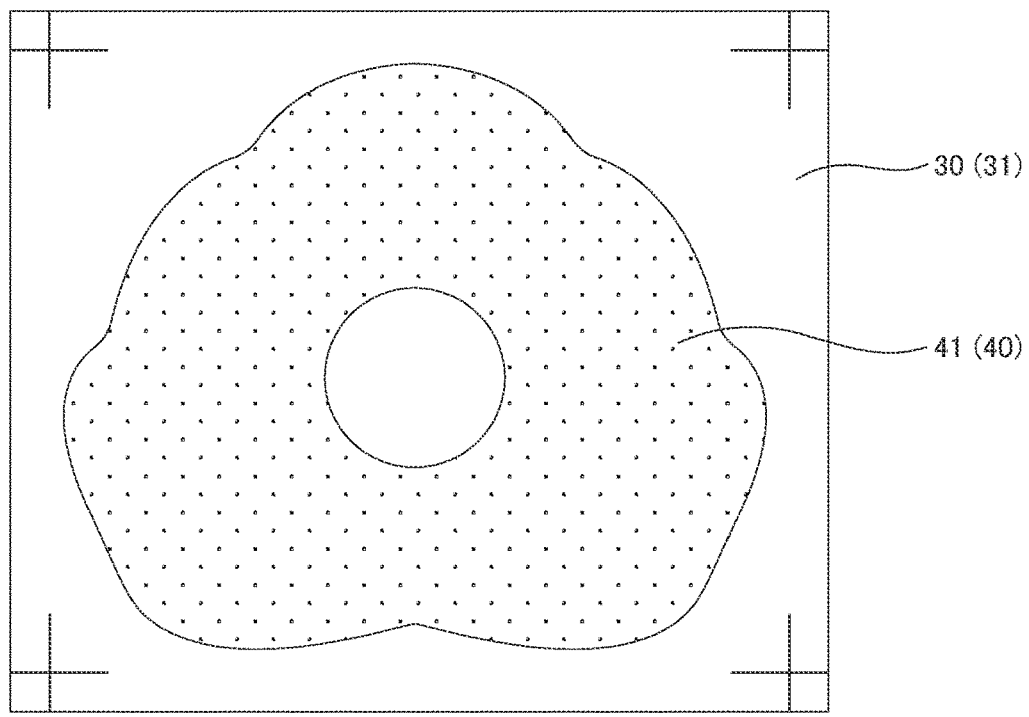
FIG. 6 is a plan view of a first printing layer, and shows a design printed onto the first printing layer.

Specifically, as shown in FIG. 6, the first printing layer 40 printed in a desired design and desired color using a transparent color ink, a matte ink, a glossy ink, or the like is formed as the upper surface of the upper layer 30 having the above-described configuration, specifically, on the upper surface of the thermoplastic synthetic resin film 31. Note that, although the first printing layer 40 is shown as one layer having a thickness in FIG. 5, as shown in FIG. 6, only the portion where a design 41 (see FIG. 4) printed on the upper surface of the upper layer 30 is present is the first printing layer 40.

In FIG. 5, a design to be shaped through a later-described first high-frequency dielectric heating step, that is, the design 41, is printed onto the first printing layer 40 such that positions corresponding to those of the bird, the leaves, and the lily emblem are colored. Out of these positions, the positions corresponding to the bird and the leaves are colored a golden color, the position corresponding to the lily emblem is colored a silver color, and portions corresponding to the leaves are colored by partially changing the depth of a color. Note that, if the vapor-deposited metal layer 32 has a silver color, a golden color can be developed by applying a yellow color or an orange color. Also, the color of the vapor-deposited metal layer 32 may be directly utilized as the silver color of the lily emblem. The first printing layer 40 can be formed through screen printing, for example. Although SG410 manufactured by Seiko advance Ltd. may be employed as a matte ink or a glossy ink to be used, for example, there is no limitation thereon.

Figure 7:
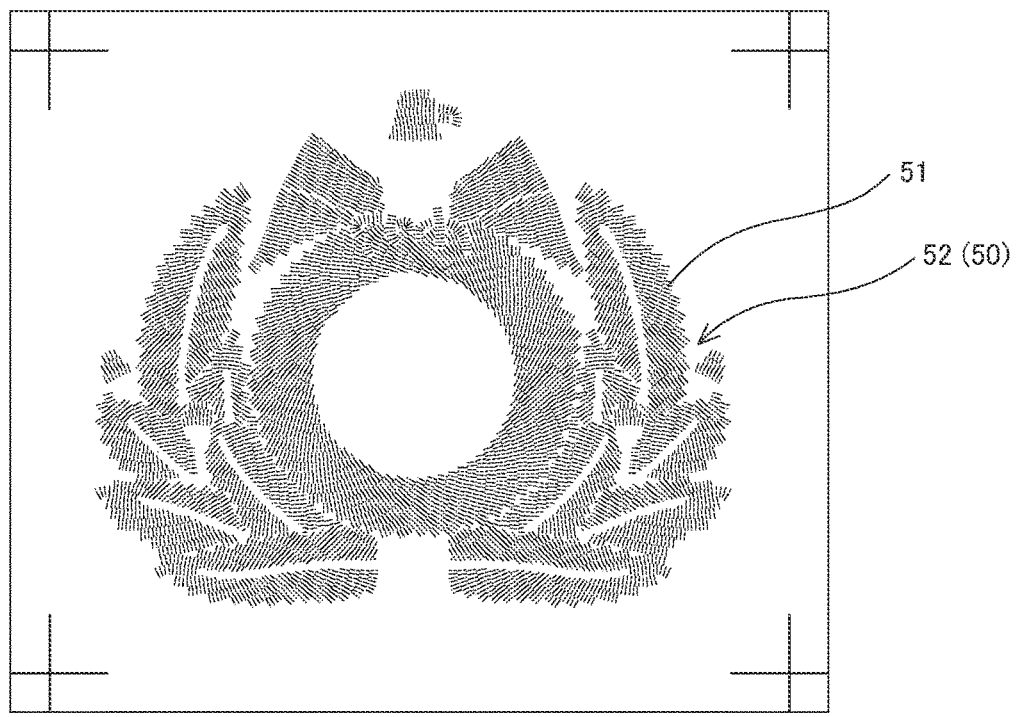
FIG. 7 is a plan view of a second printing layer, and shows a design printed onto the second printing layer.

Also, the second printing layer 50 subjected to printing using a transparent UV ink is formed on the upper surface of the first printing layer 40. The second printing layer 50 can be formed by printing, onto a desired design portion, overlapping the design 41 of the first printing layer 40, a transparent UV ink to make a design 52 realized by fine lines 51. Note that, although the second printing layer 50 is shown as one layer having a thickness in FIG. 5, only the portion present on the design 41 of the first printing layer 40 indicates the second printing layer 50. FIG. 7 only shows the design 52 constituted by the fine lines 51 printed as the second printing layer 50, and in this embodiment, in the design 41 of the first printing layer 40 shown in FIG. 6, designs constituted by the fine lines 51 are added to portions corresponding to the bird 90 and the leaves 91 (see FIG. 1). The second printing layer 50 can be implemented through screen printing, for example. Also, the fine lines 51 may be printed to have a line width of 0.1 mm to 0.25 mm, and have a line thickness of 5 μm to 15 μm. This second printing layer 50 can express, in the protruding portions 22 formed through shaping, a sense of luxuriousness, an aura of substance, elaborateness, a depth of color, and a metallic appearance such as those of lace embroidery, as well as minute recesses and protrusions, and the like.

Although a transparent UV ink used for the second printing layer 50 is an ultraviolet-curable ink and an example thereof is UV5410 manufactured by Seiko advance Ltd., for example, there is no limitation thereon.

Figure 8:
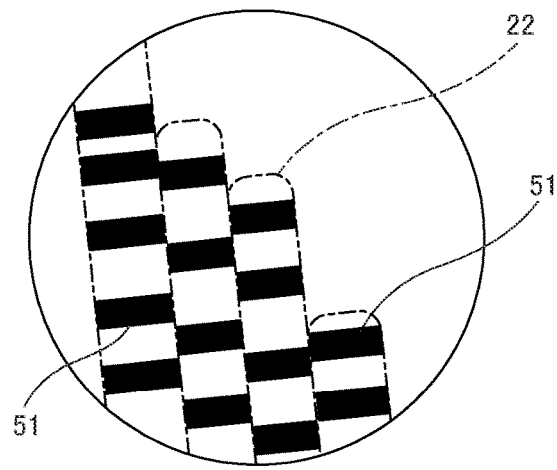
FIG. 8 is an enlarged view of a circled portion C shown in FIG. 4, and a dash-dot line shown therein indicates an outline of a protruding portion.

As shown in FIG. 8 that shows an enlarged view of a circled portion C shown in FIG. 4, a fibrous appearance of lace embroidery can be satisfactorily expressed by printing the fine lines 51 to intersect portions (indicated by a dash-dot line in FIG. 8) that will serve as protruding portions 22 as a result of being shaped through a later-described first high-frequency dielectric heating step.

In the second printing layer 50, the printed fine lines 51 are cured by irradiating the surface of the second printing layer 50 with ultraviolet rays after printing is performed using a transparent UV ink.

As shown in FIG. 5, a carrier film 70 and a polypropylene film 72 can be attached to the upper surface of the second printing layer 50 as needed. An adhesive material can be used as the carrier film 70, and when the decorative piece material 20 is fusion-cut, the carrier film 70 functions to hold the separated design at a predetermined position. Also, the polypropylene film 72 is used in order to reinforce the carrier film 70 and is disposed in tight contact with the carrier film 70. The polypropylene film may have a thickness of 30 μm to 80 μm.

Although an example of the carrier film 70 is a sheet obtained by applying an acrylic adhesive to a special polypropylene film, such as A-2430 or L-3310 HITALEX manufactured by Hitachi Chemical Company, Ltd., there is no limitation thereon. Note that, if there is a risk that an adhesive of the carrier film 70 will remain on the second printing layer 50 and the brightness of a metal tone portion of the second printing layer 50 will decrease, elimination of the carrier film 70 can prevent a decrease in the brightness thereof. In this case, although the holding force is slightly decreased, the polypropylene film 72 can function as the carrier film 70.

It is sufficient to attach the carrier film 70 to the upper surface of the second printing layer 50 using a hand roller, and to place the polypropylene film 72 thereon in tight contact therewith. Note that these films 70 and 72 are peeled off in a final process, and will not remain on the decorative piece 10.

The upper layer 30 (that includes the first printing layer 40 and the second printing layer 50), the intermediate layer 60, and the lower layer 62 that have the above-described configuration are placed on each other to constitute the decorative piece material 20, a piece of release paper is disposed on the lower surface of the lower layer 62, the three-dimensional designs are shaped on the upper layer 30 and the designs are cut in the first high-frequency dielectric heating step, and the upper layer 30, the intermediate layer 60, and the lower layer 62 are integrated with each other through fusion.

Figure 9:
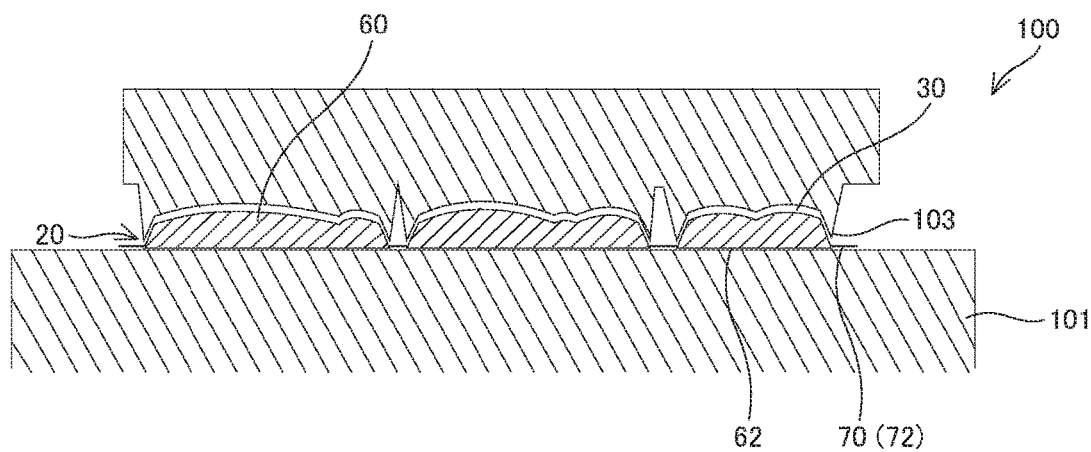
FIG. 9 is a cross-sectional view (taken along line D-D shown in FIG. 11) of a molding die used in a first high-frequency dielectric heating step.
Figure 10:
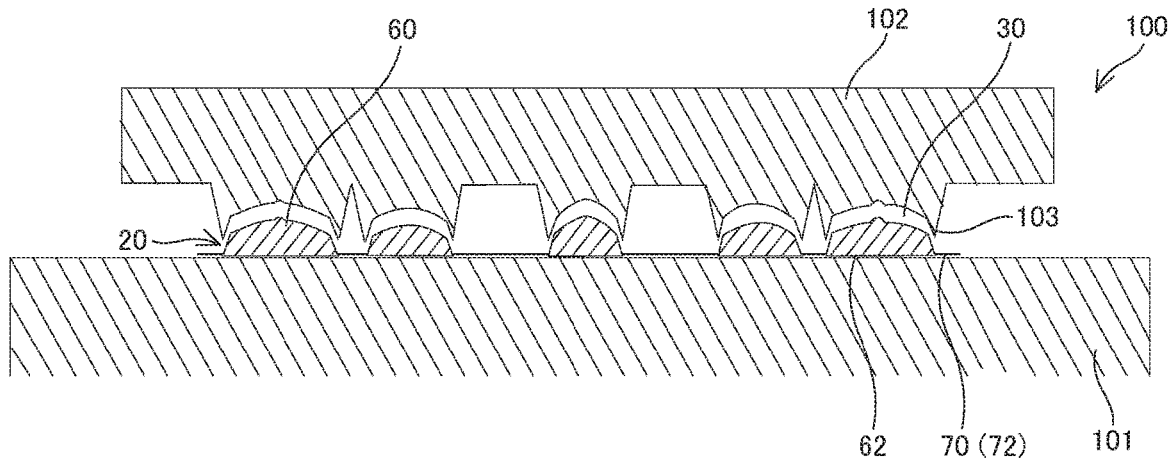
FIG. 10 is a cross-sectional view (taken along line E-E shown in FIG. 11) of the molding die used in the first high-frequency dielectric heating step.
Figure 11:
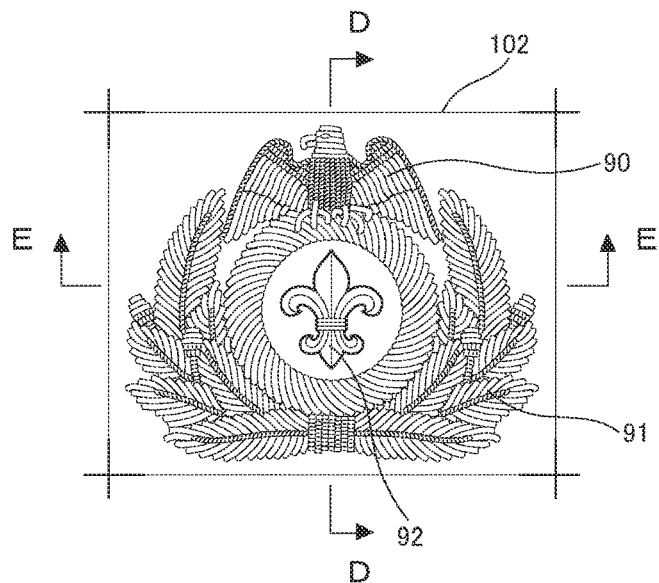
FIG. 11 is a diagram of an engraved die viewed from an engraved surface.

The first high-frequency dielectric heating step can be performed using a molding die (forming die) 100 for high-frequency dielectric heating shown in FIGS. 9 to 11. The molding die 100 includes a table 101 serving as one electrode and an engraved die 102 serving as another electrode. The table 101 is formed flat. The engraved die 102 has an engraved surface that is engraved to any shape such as a mountain shape, a trapezoidal shape, an arc shape, and other shapes, for example, in order to shape a three-dimensional design on the upper layer 30. In FIG. 10, the three-dimensional design of the engraved die 102 is constituted by recesses and protrusions that form the bird 90, the leaves 91, and the lily emblem 92. Referring to FIG. 10, it can be understood that the three-dimensional design formed in the engraved die 102 does not have recesses or protrusions in portions that correspond to the fine lines 51, and is smooth. Also, the engraved die 102 is provided with fusion-cutting blades 103 having sharp cutting edges extending along outlines of designs to be molded, at positions corresponding to outer edges of the designs. Note that the configuration of the molding die 100 is not limited to the above-described configuration, and a known molding die used in high-frequency dielectric heating can also be adopted, for example.

Therefore, the decorative piece material 20, that is, the lower layer 62 on which the release paper is disposed, the intermediate layer 60, and the upper layer 30 to which the carrier film 70 and the polypropylene film 72 are attached are placed on each other in the stated order on the table 101, and as shown in FIGS. 9 and 10, the engraved die 102 is moved downward with the engraved surface facing downward. Then, insulators of the upper layer 30, the intermediate layer 60, and the lower layer 62 generate heat and fuse to each other as a result of performing high-frequency dielectric heating in a known manner, the intermediate layer 60 expands and is shaped following the engraved surface, and the upper layer 30, the intermediate layer 60, and the lower layer 62 are welded to each other. Also, the upper layer 30, the intermediate layer 60, and the lower layer 62 are fusion-cut by the fusion-cutting blades 103 of the engraved die 102 at the outer edges of the designs simultaneously. Note that the release paper, the carrier film 70, and the polypropylene film 72 are not fusion-cut by the fusion-cutting blades 103.

Figure 12:
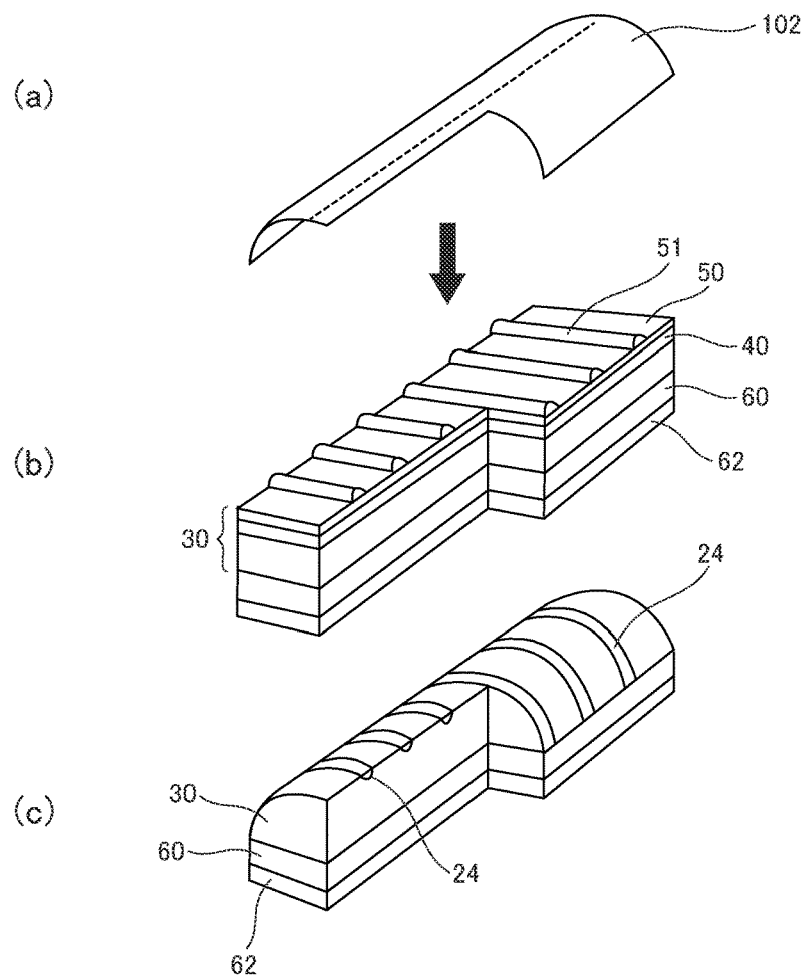
FIG. 12 is a schematic enlarged cross-sectional perspective view of the engraved surface of the engraved die and the protruding portion before and after the protruding portion is shaped.

FIG. 12(*a*) shows one engraved surface of the engraved die 102, FIG. 12(*b*) shows the decorative piece material 20 to be shaped, and FIG. 12(*c*) shows the shaped decorative piece material 20. These diagrams all show an enlarged partial cross-sectional view of one protruding portion 22 of the decorative piece material 20. Note that, with the decorative piece material 20, the release paper, the carrier film 70, and the polypropylene film 72 are not shown, and layers other than that of the fine lines 51 that constitute the second printing layer 50 are not shown as appropriate. It can be understood that, although, as shown in FIG. 12(*c*), the fine lines 51 having a film thickness remain on the protruding portion 22 as the design 24 by pressing a recessed and smooth engraved surface of the engraved die 102 shown in FIG. 12(*a*) against the decorative piece material 20 shown in FIG. 12(*b*) in the arrow direction, the fine lines 51 are pressed by the engraved die 102 through molding and sunk into the decorative piece material 20, and the protruding portion 22 does not have recesses or protrusions formed by the fine lines 51, and thus the design 24 is flat along the engraved surface.

Figure 13:
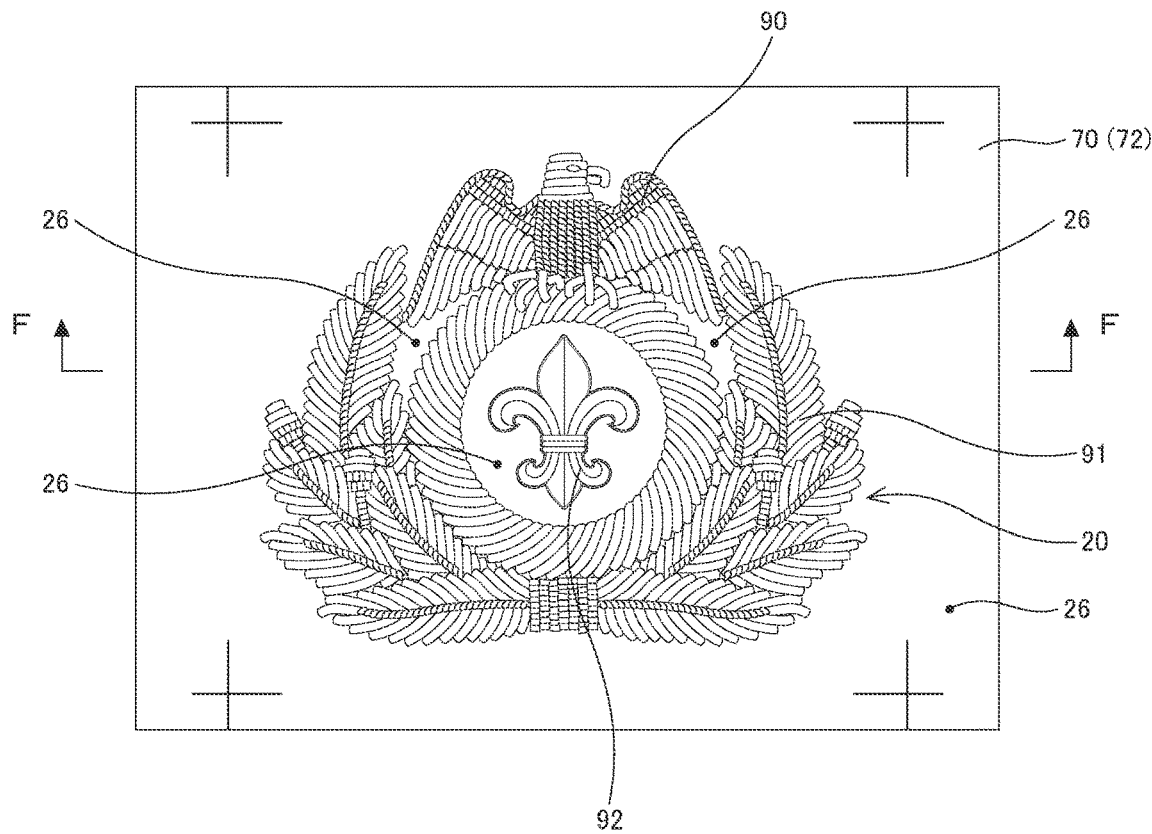
FIG. 13 is a plan view of a decorative piece material shaped through the first high-frequency dielectric heating step.
Figure 14:
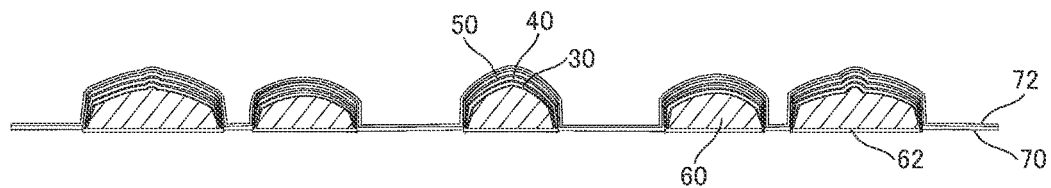
FIG. 14 is a cross-sectional view of the decorative piece material shown in FIG. 13 cut along line F-F and viewed in the arrow direction.

When high-frequency dielectric heating is complete, the engraved die 102 is moved upward, and the decorative piece material 20 is removed from the molding die 100. Although the removed decorative piece material 20 is split at the outer edges of the designs, the decorative piece material 20 is adhered to the carrier film 70 due to the adhesive force of the carrier film 70. Then, the release paper is peeled off, and as shown in FIGS. 13 and 14, unnecessary portions (indicated by reference numeral 26 in FIG. 13) of the design that has been fusion-cut from the decorative piece material 20 are peeled off from the carrier film 70 while necessary portions 90, 91, and 92 of the fusion-cut design are kept attached to the carrier film 70.

Next, a second high-frequency dielectric heating step for integrating the obtained decorative piece material 20 with the base material sheet 80 is performed. Examples of the base material sheet 80 may include a woven fabric, a knitted fabric, a nonwoven fabric, felt, a synthetic resin sheet, and a synthetic leather.

Figure 15:
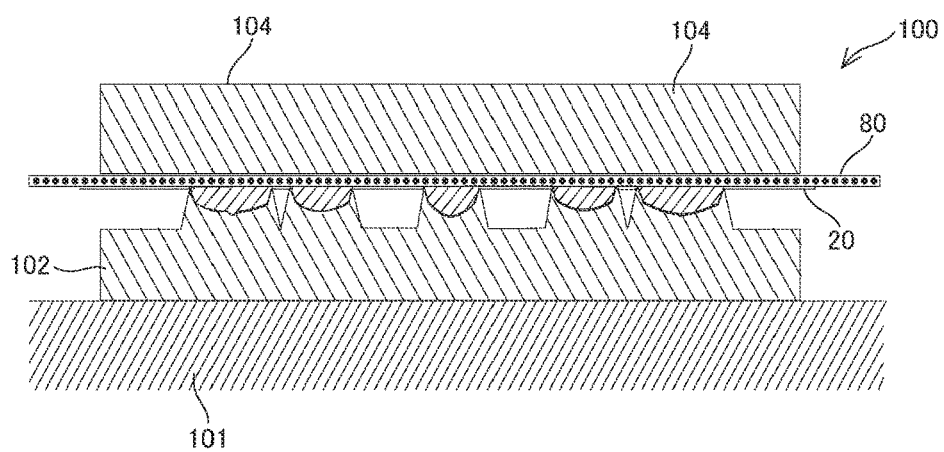
FIG. 15 is a cross-sectional view of a molding die used in a second high-frequency dielectric heating step.

In the second high-frequency dielectric heating step, as shown in FIG. 15, the molding die 100 is configured such that the engraved die 102 used previously is placed on the table 101 as one electrode, and a flat die 104 serving as another electrode is disposed above the engraved die 102 to be capable of being brought closer thereto. The engraved die 102 is placed with the engraved surface thereof facing upward, the decorative piece material 20 from which unnecessary portions have been eliminated is fitted into the engraved die 102 such that the polypropylene film 72 faces downward and the thermal bonding film that serves as the lower layer 62 faces upward, and the base material sheet 80 is placed on the upper surface of the decorative piece material 20 with the surface of the base material sheet 80 facing downward.

Then, as shown in FIG. 15, the flat die 104 is moved downward toward the engraved die 102, and pressing is performed by the flat die 104 while performing high-frequency dielectric heating in a known manner, and thus the thermal bonding film serving as the lower layer 62 of the decorative piece material 20 is fused and the decorative piece material 20 is firmly welded to the base material sheet 80.

When the second high-frequency dielectric heating step is complete, the flat die 104 is moved upward, the decorative piece material 20 and the base material sheet 80 that are integrated with each other are removed from the engraved die 102, the polypropylene film 72 and the carrier film 70 are peeled off from the surface thereof, and the three-dimensional decorative piece 10 made of a thermoplastic synthetic resin can be obtained by cutting the base material sheet 80 to any outer shape as shown in FIG. 1. A known method such as Thomson punching or laser cutting may be used as a method for cutting the base material sheet 80.

As shown in FIGS. 1 and 3, with the obtained decorative piece 10, in the protruding portions 22 shaped through the first high-frequency dielectric heating step, fibrous designs are expressed in color by the fine lines 51, the fine lines 51 constitute a design 24 that provides a visual impression such as those of recesses (grooves) due to differences in colors, can embody an architectural design having a three-dimensional appearance such as that of gold lace embroidery, and have a sense of luxuriousness, an aura of substance, elaborateness, a depth of color, a metallic appearance, and the like.

Also, in the second high-frequency dielectric heating step, the decorative piece material 20 and the base material sheet 80 are bonded as firmly as possible to each other through fusion of the thermal bonding film of the lower layer 62, as compared with a conventional configuration, and thus it is also possible to prevent the decorative piece material 20 and the base material sheet 80 from separating from each other through washing, friction, and the like.

The foregoing description is given merely to describe the present invention, and therefore should not be construed as limiting the invention recited in the appended claims or narrowing the scope of the present invention. Also, the constituent elements of the present invention are not limited to those described in the embodiments above, and it is of course possible to make various modifications within the technical scope defined in the appended

LIST OF REFERENCE NUMERALS

10 Three-dimensional decorative piece made of thermoplastic synthetic resin
20 Decorative piece material
22 Protruding portion
24 Design
30 Upper layer
31 Thermoplastic synthetic resin film
32 Vapor-deposited metal layer
40 First printing layer
50 Second printing layer
51 Fine line
60 Intermediate layer
62 Lower layer
70 Carrier film
72 Polypropylene film
80 Base material sheet
100 Molding die
101 Table
102 Engraved die

The invention claimed is:

1. A method for producing a three-dimensional decorative piece of a thermoplastic synthetic resin by subjecting a decorative piece material to high-frequency dielectric heating, wherein the decorative piece material comprises
    a lower layer of a thermal bonding film,
    an intermediate layer of a thermoplastic synthetic resin sheet wherein the intermediate layer is stacked on the lower layer, and
    an upper layer of a thermoplastic synthetic resin film wherein the upper layer is provided on a lower side thereof with a vapor-deposited metal layer and is stacked on the intermediate layer,
    the upper layer including a first printing layer and a second printing layer, wherein the first printing layer is formed on an upper surface of the upper layer by screen printing thereon a transparent color ink, a matte ink, or a glossy ink, and the second printing layer is formed on an upper surface of the first printing layer by screen printing thereon a fine line using a transparent UV ink, wherein the second printing layer is cured by irradiated ultraviolet rays such that the fine line has a thickness and is provided on an upper surface thereof with an adhesive carrier film,
    the method comprising:
    a placing step of placing the decorative piece material on top of a table to be served as one electrode during high-frequency dielectric heating;
    a first high-frequency dielectric heating step including pressing an engraved die against the upper layer of the decorative piece material wherein the engraved die is served as another electrode during high-frequency dielectric heating, and performing high-frequency dielectric heating for the decorative piece material whereby the upper layer of the decorative layer is bulged into a protruded form having a three-dimensional design, a portion other than the carrier film is fusion-cut with an outer contour line of the engraved die, the upper layer is fused with the intermediate layer, and the intermediate layer is fused with the lower layer,
    a removing step of removing an unnecessary portion that does not constitute the three-dimensional design in the fusion-cut decorative piece material;
    a second high-frequency dielectric heating step including positioning the decorative piece material into the engraved die placed on the table with an engraved surface facing upward such that the three-dimensional design of the decorative piece material fits into the engraved surface of the engraved die, placing a base material on the decorative piece material, pressing the base material against the decorative piece material using a flat-plate die from above the base material, and performing high-frequency dielectric heating to weld the base material and the decorative piece material to each other; and
    an adjustment step including bringing out the welded decorative piece material and base material from the engraved die, peeling off the carrier film, and cutting the base material to a desired shape to obtain the three-dimensional decorative piece of a thermoplastic resin.

2. The method for producing a three-dimensional decorative piece of a thermoplastic synthetic resin according to claim 1 wherein
    the upper layer of the decorative piece material further comprises a migration prevention film provided on a lower side of the vapor-deposited metal layer via a first adhesive layer and a second thermoplastic synthetic resin film provided on the migration prevention film via a second adhesive layer.

* * * * *